(12) United States Patent
Choi

(10) Patent No.: US 6,356,772 B1
(45) Date of Patent: Mar. 12, 2002

(54) METHOD OF RESTRICTING THE CALL OF A MOVING SUBSCRIBER IN A SWITCHED RADIO TELEPHONE SYSTEM ACCORDING TO INTERNATIONAL STANDARD PROTOCOL IS-41C

(75) Inventor: Hee-Chang Choi, Kyongsangbuk-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/382,680

(22) Filed: Aug. 25, 1999

(30) Foreign Application Priority Data

Aug. 26, 1998 (KR) ............................. 98/34663

(51) Int. Cl.[7] ............................. H04M 1/00; H04M 7/20
(52) U.S. Cl. ........................ 455/564; 455/560; 455/435
(58) Field of Search ............................. 455/3.05, 561, 455/560, 564, 565, 435, 433

(56) References Cited

U.S. PATENT DOCUMENTS

| 4,887,260 | A | * | 12/1989 | Carden et al. ................ 370/60 |
|---|---|---|---|---|
| 5,757,767 | A | * | 5/1998 | Zehavi ........................ 370/208 |
| 5,781,628 | A | * | 7/1998 | Alperovich et al. ........... 380/9 |
| 5,850,445 | A |  | 12/1998 | Chan et al. |
| 5,867,527 | A | * | 2/1999 | Ziv et al. ..................... 375/208 |
| 5,915,220 | A |  | 6/1999 | Chelliah |
| 6,081,731 | A | * | 6/2000 | Boltz et al. .................. 455/565 |
| 6,188,354 | B1 | * | 3/2001 | Soliman et al. ............. 342/387 |

* cited by examiner

Primary Examiner—William Trost
Assistant Examiner—Sheila Smith
(74) Attorney, Agent, or Firm—Robert E. Bushnell, Esq.

(57) ABSTRACT

A method of restricting the call of a moving subscriber in a switched radio telephone system employing the moving subscriber profile of international standard protocol IS-41C, which consists of 8 bits with the upper 4 bits representing the values to respectively restrict a service provider, system, area and cell and the lower 4 bits to restrict the scope of the values, comprises the steps of registering the call restriction regions of a moving subscriber in a moving subscriber control register according to a given parameter of the moving subscriber profile, searching the call restriction information of the moving subscriber registered in the moving subscriber profile of the control register when receiving or sending a call, and allowing the call provided the moving subscriber agrees with the call restriction information.

7 Claims, 2 Drawing Sheets

| GEOGRAPHIC AUTHORIZATION |
|---|
| OCTET |

| H | G | F | E | D | C | B | A |
|---|---|---|---|---|---|---|---|

| BITS | H | G | F | E | D | C | B | A | VALUE | MEANING |
|---|---|---|---|---|---|---|---|---|---|---|
|  | 0 | 0 | 0 | 0 | 0 | 0 | 0 | 0 | 0 | RESERVE |
|  | 0 | 0 | 0 | 0 | 0 | 0 | 0 | 1 | 1 | ALLOWANCE OF CALL FOR ALL SERVICE PROVIDERS |
|  | 0 | 0 | 0 | 0 | 0 | 0 | 1 | 0 | 2 | ALLOWANCE OF CALL FOR A SINGLE SERVICE PROVIDER |
|  | 0 | 0 | 0 | 0 | 0 | 0 | 1 | 1 | 3 | ALLOWANCE OF CALL IN A SINGLE SYSTEM |
|  | 0 | 0 | 0 | 0 | 0 | 1 | 0 | 0 | 4 | ALLOWANCE OF CALL IN A SINGLE LAI |

| PROFILE |
|---|
| AUTHENTICATION CAPABILITY |
| CALLING FEATURES INDICATOR |
| CARNER DIGITS |
| DMH_ACCOUNT CODE DIGITS |
| DMH_ALTERNATE BILLING DIGITS |
| DMH_BILLING DIGITS |
| GEOGRAPHIC AUTHORIZATION |
| MESSAGE WAITING NOTIFICATION COUNT |
| MESSAGE WAITING NOTIFICATION TYPE |
| MOBILE DIRECTORY NUMBER |
| ORIGINATION INDICATOR |
| ORIGINATION TRIGGERS |
| PACA INDICATOR |
| PREFERRED LANGUAGE INDICATOR |
| RESTRICTION DIGITS |
| ROUTING DIGITS |
| SMS_ORIGINATION RESTRICTIONS |
| SMS_TERMINATION RESTRICTIONS |
| SPINIPIN |
| SPIN TRIGGERS |
| TERMINATION RESTRICTION CODE |
| TERMINATION TRIGGERS |

FIG. 1

*(Prior Art)*

| GEOGRAPHIC AUTHORIZATION | | | | | | | |
|---|---|---|---|---|---|---|---|
| OCTET | | | | | | | |
| H | G | F | E | D | C | B | A |

| BITS H | G | F | E | D | C | B | A | VALUE | MEANING |
|---|---|---|---|---|---|---|---|---|---|
| 0 | 0 | 0 | 0 | 0 | 0 | 0 | 0 | 0 | RESERVE |
| 0 | 0 | 0 | 0 | 0 | 0 | 0 | 1 | 1 | ALLOWANCE OF CALL FOR ALL SERVICE PROVIDERS |
| 0 | 0 | 0 | 0 | 0 | 0 | 1 | 0 | 2 | ALLOWANCE OF CALL FOR A SINGLE SERVICE PROVIDER |
| 0 | 0 | 0 | 0 | 0 | 0 | 1 | 1 | 3 | ALLOWANCE OF CALL IN A SINGLE SYSTEM |
| 0 | 0 | 0 | 0 | 0 | 1 | 0 | 0 | 4 | ALLOWANCE OF CALL IN A SINGLE LAI |

FIG. 2

| GEOGRAPHIC AUTHORIZATION | | | | | | | |
|---|---|---|---|---|---|---|---|
| OCTET | | | | | | | |
| H | G | F | E | D | C | B | A |

| BITS H | G | F | E | VALUE | MEANING |
|---|---|---|---|---|---|
| 0 | 0 | 0 | 0 | 0 | RESERVE |
| 0 | 0 | 0 | 1 | 1 | ALLOWANCE OF CALL FOR ALL SERVICE PROVIDERS |
| 0 | 0 | 1 | 0 | 2 | ALLOWANCE OF CALL FOR ONE OR MORE SERVICE PROVIDERS |
| 0 | 0 | 1 | 1 | 3 | ALLOWANCE OF CALL FOR ONE OR MORE SYSTEMS |
| 0 | 1 | 0 | 0 | 4 | ALLOWANCE OF CALL FOR ONE OR MORE LAI's |
| 0 | 1 | 0 | 1 | 5 | ALLOWANCE OF CALL FOR ONE OR MORE CELLS |

| BITS D | C | B | A | VALUE | MEANING |
|---|---|---|---|---|---|
| 0 | 0 | 0 | 0 | 0 | LENGTH (YES, LAI NUMBER..) |
| ... | | | | | |
| 1 | 1 | 1 | 1 | 1 | |

FIG. 3

METHOD OF RESTRICTING THE CALL OF A MOVING SUBSCRIBER IN A SWITCHED RADIO TELEPHONE SYSTEM ACCORDING TO INTERNATIONAL STANDARD PROTOCOL IS-41C

CLAIM OF PRIORITY

This application makes reference to, incorporates the same herein, and claims all benefits accruing under 35 U.S.C §119 from an application entitled Method Of Restricting The Call Of A Moving Subscriber In A Switched Radio Telephone System According To International Standard Protocol IS-41C earlier filed in the Korean Industrial Property Office on Aug. 26, 1998, and there duly assigned Ser. No. 98-34663 by that Office.

BACKGROUND OF THE INVENTION

1. Field of the Invention

The present invention relates to the standard protocol of IS-41C and to providing call restrictions on a moving subscriber in a radio communication system, and more particularly a method of restricting the call of a moving subscriber within a contract areas for which the moving subscriber has contracted with a radio communication service provider to receive the service.

2. Description of the Related Art

There has been developed and standardized the technology for controlling the mobility of a moving subscriber for CDMA (Code Division Multiple Access) or PCS (Personal Communication Service) starting from IS-41A of EIA/TIA (Telecommunications Industry Association/Electronic Industries Association) in the year of 1991, and IS-41C in the year of 1995 was established as the standard protocol for controlling a moving subscriber, for example, in the Korean PCS systems and the Chinese Shanghai model DCS system. Discussions of the IS-41C protocol are provided in U.S. Pat. No. 5,850,445 to Yick Man Chan et al. entitled Authentication Key Management System And Method and U.S. Pat. No. 5,915,220 to Sivananthan Chelliah entitled System And Method For Maintaining Profile Information In A Telecommunications Network, both being incorporated by reference herein.

The information on a moving subscriber defined in the standard protocol of IS41C is stored into a parameter called 'profile', where the restriction of a call is defined. FIG. 1 shows the definition for restricting a call stored in a conventional moving subscriber profile of IS-41C standard protocol. According to the definition of the parameter of the geographic authorization in the moving subscriber profile, there are shown four types of call restrictions of a moving subscriber, as follows:

1. Allowance of call for all service providers.
2. Allowance of call for one service provider.
3. Allowance of call in one system.
4. Allowance of call in one location area ID (LAI).

Presently, although each communication service provider does not provide for the function to restrict a call according to the systems or areas, such function would be necessary. According to the above moving subscriber profile of IS-41C, the last unit of the calling range is defined based on LAI. For example, when there is defined a moving subscriber allowed to receive the services only in area 'A', a plurality of systems or LAI's cause some problems in restricting the call. Hence, the call restriction defined as defined in the conventional moving subscriber profile of IS-41C standard protocol can not provide for proper restriction of the call. In addition, a Russian city may be provided with the services as a single cell or two cells, so that there is demanded the function to restrict the call by cell.

SUMMARY OF THE INVENTION

It is an object of the present invention to provide a method for restricting the call of a moving subscriber which may provide a call restriction by cells in addition to the four types of call restrictions defined in the parameter of the geographic authorization of the moving subscriber profile in IS-41C standard protocol.

It is another object of the present invention to provide a method for restricting the call of a moving subscriber which may change the value of the parameter of the geographic authorization to provide multiple restrictions for each restriction type.

According to the present invention, a method of restricting the call of a moving subscriber in a switched radio telephone system employing the moving subscriber profile of international standard protocol IS41C, which consists of 8 bits with modification of the upper 4 bits to represent values to restrict a moving subscriber, respectively, to a service provider, system, area and cell and the lower 4 bits to restrict the scope of the values, comprises the steps of registering the call restriction regions of a moving subscriber in a moving subscriber control register according to a given parameter of the moving subscriber profile, searching the call restriction information of the moving subscriber registered in the moving subscriber profile of the control register when receiving or sending a call, and allowing the call provided the moving subscriber agrees with the call restriction information.

The present invention will now be described more specifically with reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 is a block diagram for illustrating the profile parameter of an IS-41C standard protocol;

FIG. 2 is a block diagram for illustrating the call restriction of a moving subscriber defined in the conventional geographic authorization parameter of IS-41C standard protocol; and FIG. 3 is a block diagram for illustrating the call restriction of a moving subscriber defined in the geographic authorization parameter according to the present invention.

DETAILED DESCRIPTION OF THE PREFERRED EMBODIMENTS

Referring to FIG. 3, bits H–E correspond to the geographic authorization parameter regarding a call restriction range of a moving subscriber, as follows:

0. The setting of bits H–E to 0000, is reserved for later use.
1. When bits H–E are 0001, respectively, then the geographic authorization parameter provides for the allowance of a call for all service providers.

2. When bits H–E are 0010, respectively, then the geographic authorization parameter provides for the allowance of call for one service provider.

3. When bits H–E are 0011, respectively, then the geographic authorization parameter provides for the allowance of call in one or more systems.

4. When bits H–E are 0100, respectively, then the geographic authorization parameter provides for the allowance of call in one or more LAI's.

5. When bits H–E are 0101, respectively, then the geographic authorization parameter provides for the allowance of call in one or more cells.

The geographic authorization parameter consists of an octet with the upper four bits (A–D) representing the scope of the restriction values and the lower four bits (E–H) the range (defined as "one or more") of the restriction values. The geographic parameter means to allow the call of a moving subscriber only within the range of the call restriction value that is registered for the moving subscriber among the above five definitions of call restriction. The upper four bits (A–D) have values between and including 0000 and 1111, i.e., 0–64, and these restriction values identify the specific service provider, system, LAI or cell.

Therefore, according to the method of restricting the call of a moving subscriber in a switched radio telephone system employing the moving subscriber profile of the international standard protocol IS-41C, which consists of an 8 bit geographic authorization parameter, wherein the upper 4 bits represent the restrictions values to respectively restrict a service provider, system, area and cell and the lower 4 bits represent the values to restrict the scope of these restriction values, the call restriction regions of a moving subscriber are registered in a moving subscriber control register according to a given parameter of the moving subscriber profile. Then, when the moving subscriber places a call or receives a call, the call restriction information of the moving subscriber registered in the moving subscriber profile of the control register is searched to determine the range and scope of restriction placed on the moving subscriber. Then, based on the result of the search, a call is permitted or restricted according to the call restriction profile of the moving subscriber.

For example, when a moving subscriber 'A' is registered to receive and send a call only in cell 'β', he is not allowed a call in another cell 'α'. Namely, the call is allowed for a moving subscriber only when the information of the moving subscriber agrees with the moving subscriber profile registered in the control register (location register) adjacent to or in the cell where the moving subscriber is presently located.

Describing the application of the geographic authorization parameter, as modified according to the present invention, the moving subscriber sends to an adjacent VLR (Visitor Location Register, i.e., visitor control register) the information of the cell where he presently is. When the cell is in the range of the HLR (Home Location Register, i.e., home control register), the information on the moving subscriber is sent to the HLR. Receiving the information of the cell from the moving subscriber and the registered information of the profile, including the geographic authorization parameter, corresponding to the moving subscriber from the HLR, the VLR searches the registered information of the profile to compare the received cell information with the information of the cell where the moving subscriber is allowed. When the cell, where the moving subscriber presently is, is in the range of the cell where he is allowed to make the call, the switching system allows the call to be connected with the receiver. However, if he is presently out of the allowed call service range, the switching system processes the call as failed, and may send a guide message representing no service back to the moving subscriber. Of course, if he is registered to receive the service in multiple cells "α& β& γ", and presently in the cell 'β', he may receive the service.

Thus, if a moving subscriber is registered to receive the service in selected cells, it is not necessary to perform the hand-off operation to maintain the communication when he moves from the present service cell to an adjacent service cell. This may be achieved without modifying the system, and makes it possible to distinguish a moving subscriber who wishes to receive the service in a single cell from another who wishes to receive the services of multiple cells, so that it is possible to differentiate the service based on a different cost system. This additionally makes it possible to restrict the movement of a moving subscriber within a specific area. Moreover, the geographic authorization parameter may be modified for different conditions to allow the call.

While the present invention has been described in connection with specific embodiments accompanied by the attached drawings, it will be readily appreciated by those skilled in the art that various changes and modifications may be made thereto without departing the gist of the present invention.

What is claimed is:

1. A method of restricting the call of a moving subscriber (MS) in a switched radio telephone system employing a moving subscriber profile, of an international standard protocol IS-41C type, which consists of a geographic authorization parameter comprised of 8 bits with the upper 4 bits representing the values to respectively restrict a service provider, system, area and cell and the lower 4 bits restrict the scope of said values, comprising the steps of:

registering moving subscriber profiles of moving subscribers in a moving subscriber control register according to given parameters of said geographic authorization parameter;

searching the moving subscriber profile of one of said moving subscribers registered in the moving subscriber control register, when said one of said moving subscribers is receiving or sending a call; and allowing said call provided said moving subscriber is not restricted by the searched moving subscriber profile.

2. A method as defined in claim 1, wherein the step of searching the comprises a step of:

determining the range and scope of restriction placed on said moving subscriber with the searched moving subscriber profile registered in said moving subscriber control register to determine whether said moving subscriber is allowed to receive or send said call.

3. A method as defined in claim 2, wherein said given parameters in the step of registering the moving subscriber profiles selectively allow calls for all service providers, one or more service providers, one or more systems, one or more areas, or one or more cells.

4. A method as defined in claim 3, further comprising steps of:

processing said call as failed and transmitting a guide message to said moving subscriber when it is determined the range and scope of restriction placed on said moving subscriber does not allow the moving subscriber to receive or send said call.

5. A method of restricting the call of a moving subscriber (MS) in a switched radio telephone system employing the moving subscriber profile of international standard protocol IS-41C, comprising the steps of:

registering a moving subscriber profile which includes a geographic authorization parameter comprised of 8 bits with the upper 4 bits representing the values to respectively restrict a service provider, system, area and cell and the lower 4 bits restrict the scope of said values, in a moving subscriber control register;

searching the geographic authorization parameter of said moving subscriber profile registered in said control register when receiving or sending a call; and allowing said call when said geographic authorization parameter of said moving subscriber is not restricted by one of said values restricting a service provider, system, area or cell as restricted by said lower 4 bits.

6. The method as set forth in claim 5, wherein said step of registering comprises storing said moving subscriber profile in a home location register as said control register.

7. The method as set forth in claim 5, wherein said step of searching comprises the steps of:

receiving cell information and moving subscriber information in a visitor location register, said cell information corresponding to a current location of said moving subscriber;

transmitting an inquiry to said control register for said control register to return said moving subscriber profile including said geographic authorization parameter to said visitor location register;

determining whether said moving subscriber is restricted according to said upper 4 bits of said geographic authorization parameter; and determining a scope of a restriction according to said lower 4 bits of said geographic authorization parameter, when it is determined that said moving subscriber is restricted according to said upper 4 bits of said geographic authorization parameter.

* * * * *